United States Patent [19]

Simas et al.

[11] Patent Number: 5,348,655
[45] Date of Patent: Sep. 20, 1994

[54] METHOD FOR INCREASING THE CAPACITY OF SEWAGE TREATMENT PLANT

[75] Inventors: Luis E. D. Simas, Palos Park, Ill.; Jesus F. Gaztambide, Madrid, Spain

[73] Assignee: Liquid Carbonic Corporation, Oak Brook, Ill.

[21] Appl. No.: 86,692

[22] Filed: Jul. 2, 1993

[51] Int. Cl.$^5$ .................................................. C02F 3/12
[52] U.S. Cl. ..................................... 210/625; 210/626; 210/627
[58] Field of Search ................. 210/623, 625, 626, 627

[56] References Cited

U.S. PATENT DOCUMENTS 3,547,814  7/1969  McWhirler ........................ 210/627
4,163,712  8/1979  Smith ................................. 210/627
4,442,005  4/1984  Breider ............................. 210/627

FOREIGN PATENT DOCUMENTS 922432  3/1973  Canada ............................... 210/624
2514637  10/1975  Fed. Rep. of Germany ...... 210/627

*Primary Examiner*—Neil McCarthy
*Attorney, Agent, or Firm*—Fitch, Even, Tabin & Flannery

[57] ABSTRACT

The present invention is directed to a method for increasing the capacity of a sewage treatment plant. In the method, oxygen is injected into the recycle sludge stream from the settling tank prior to introducing the recycle sludge stream into the secondary waste water treatment tank.

2 Claims, 2 Drawing Sheets

5,348,655

METHOD FOR INCREASING THE CAPACITY OF SEWAGE TREATMENT PLANT

FIELD OF INVENTION

The present invention is directed to a method for increasing the capacity of a sewage treatment plant. More particularly, the method of the present invention is directed to a method for increasing the capacity of a sewage treatment plant by injecting oxygen into a recycle sludge stream which is provided from a settling tank prior to introducing the recycle sludge stream into the secondary waste water treatment tank.

BACKGROUND OF THE INVENTION

Sewage treatment plants generally consist of a primary settling tank wherein large particles are removed by screening or are settled through use of a flocculant such as aluminum chloride. The partially clarified waste water containing fine particles and colloidal materials which are generally organic in nature is transferred to a secondary waste water treatment tank for aeration of the waste water. A source of microorganisms is introduced into the secondary tank to digest the organic material contained in the water transferred from the primary treatment tank. After passage through the secondary treatment tank the water with digested waste material is transferred to a settling tank where the digested organic material settles to the bottom of the tank as sludge and clarified water passes from the top of the tank. The clarified water generally had 30 ppm BOD or less. The clarified water may then be subjected to tertiary treatment by chlorination or other means. The sludge from the settling tank generally is divided into two streams, an outlet sludge take-off stream and a recycle sludge stream. The recycle sludge stream is reintroduced into the secondary waste water treatment tank for aeration and further reduction in organic content and to supply microorganisms for the secondary waste water treatment tank.

It is known in the sewage treatment industry to introduce oxygen into the water stream from the primary treatment tank prior to introduction into the secondary waste water treatment tank. In general, oxygen is injected at a level sufficient to provide a saturated level of oxygen of about 20 to 30 ppm. The oxygenated water stream from the primary treatment tank is then introduced into the secondary waste water treatment tank. The recycled sludge stream has substantially no oxygen content and the microorganisms are in a dormant state. The combined recycled sludge stream and the oxygenated waste water stream from the primary treatment tank results in producing a level of oxygen in the secondary waste water stream of less than about 2.5 ppm after a period of stabilization. This is the maximum level of oxygen that can be tolerated by the microorganisms during aeration and digestion of the waste in the secondary waste water treatment tank.

A primary difficulty with oxygenation of the waste water stream from the primary treatment tank is that a substantial amount of the residence time of the organic waste in the secondary waste water treatment tank is consumed by activating the microorganisms contained in the recycle sludge stream. The present invention is directed to a method for activation of such microorganisms by a direct injection of oxygen into the recycle sludge stream.

SUMMARY OF THE INVENTION

The present invention is directed to a method for increasing the capacity of a sewage treatment plant. In the method, oxygen is injected into the recycle sludge stream from the settling tank prior to introducing the recycle sludge stream into the secondary waste water treatment tank.

In an important embodiment of the invention, the oxygen level of the recycle sludge stream is gradually increased from a startup level of substantially no oxygen to a maximum stabilized level over a period of time. The startup level is generally less than about 0.5 ppm which is gradually increased to a stabilized level of from about 2 ppm to about 5 ppm.

DETAILED DESCRIPTION OF THE INVENTION

Figure 1:
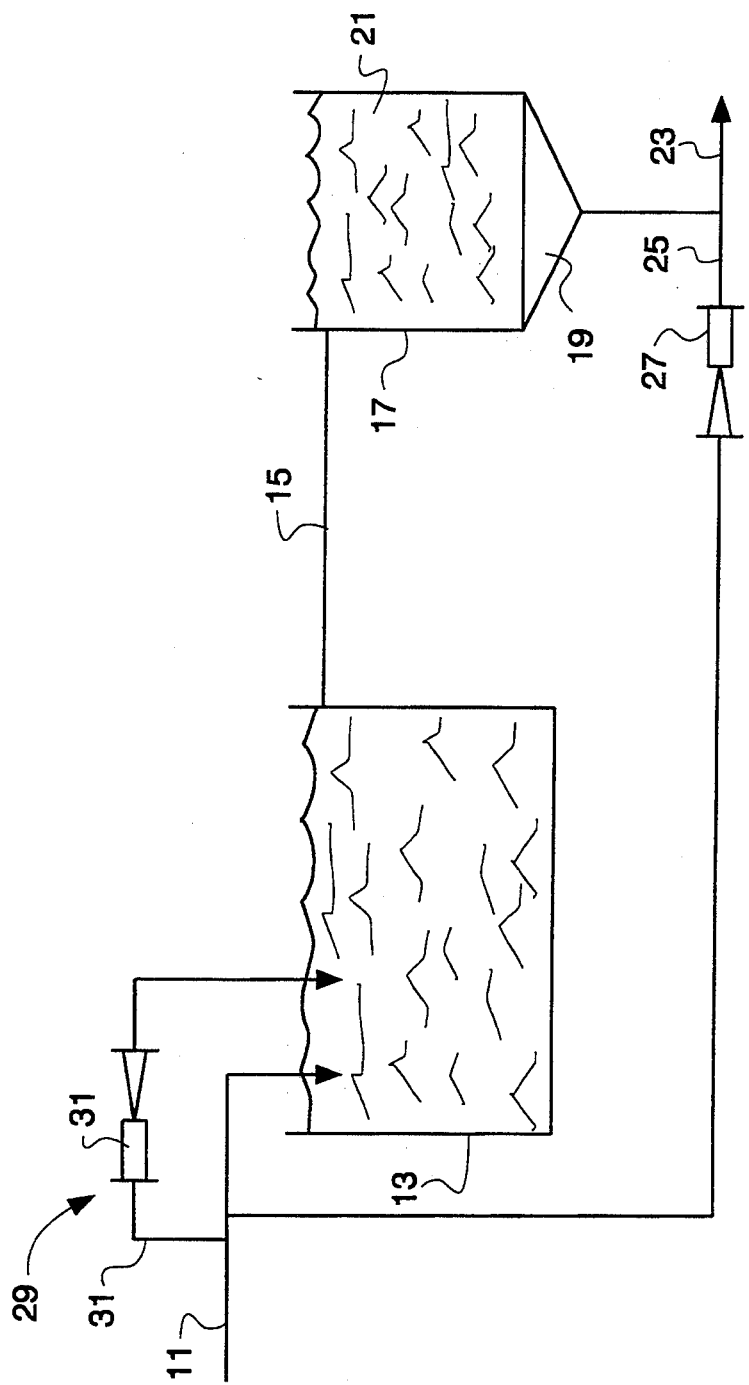
FIG. 1 is a flow diagram of a portion of a sewage treatment system of the invention showing direct injection of oxygen into a recycle sludge stream.

As shown in FIG. 1 a waste water stream 11 from a primary treatment tank (not shown) is introduced into a secondary waste water treatment tank 13. The waste water from the primary treatment tank generally has a BOD in the range of from about 200 to about 500 and may sometimes be as high as 1000. The waste water stream 11 contains colloidal and particulate organic matter which is digested by microorganisms during transition through the secondary waste water treatment tank 13. The waste water with the digested organic material is then transferred through conduit 15 to a settling tank 17. The digested organic material settles in settling tank 17 to provide a sludge 19 in the bottom of the tank and clarified water 21 in the top of the tank. The clarified water is taken off the top of tank 17 and generally has a BOD of less than about 30. The sludge 19 from the bottom of settling tank 17 is divided into two streams. A portion of the sludge 23 is removed from the sewage treatment system as treated sludge. Another portion of the sludge 19 is recycled through conduit 25 to be returned to the secondary waste treatment tank 13.

In accordance with the invention, oxygen is injected into the recycle sludge stream through eductor 27. The sludge exiting from the settling tank 17 has inactivated microorganisms contained therein. These inactivated microorganisms are energized by injection of the oxygen directly into recycle sludge stream 25. The injection of oxygen directly into recycle sludge stream 25 permits the activation of the microorganisms without the necessity for a lengthy period of activation in the secondary waste treatment tank 13. Such direct actiration increases the capacity of the sewage treatment plant by a factor of up to about 30%.

Upon startup of the sewage treatment plant the sludge exiting from settling tank 17 has substantially no oxygen contained therein. In an important embodiment of the invention, it has been determined that it is desirable to gradually increase the oxygen level in the recycle sludge stream 25 over a period of time. The sewage treatment system is generally operated over a period of several weeks or months. During operation, a portion of the sludge will be continuously recycled and the microorganisms can be acclimated to a substantially high level of instant oxygen injection by gradually increasing the oxygen level of the sludge over a period of time of from about three days to about seven days. From the initial startup sludge oxygen level of less than about 0.5 ppm it is preferred to increase the oxygen level of the sludge from the initial level to a level of from about 2 to about 5 ppm oxygen over a period of from three to about five days.

As shown in FIG. 1, a waste water oxygenation system 29 is also provided. A bypass line 31 is taken off of waste water stream 11 and an eductor 31 is used to inject oxygen into the waste water stream. The use of the waste water oxygenation system 29 in combination with the direct oxygenation of the recycle sludge stream permits fine tuning of the sewage treatment plant.

Figure 2:
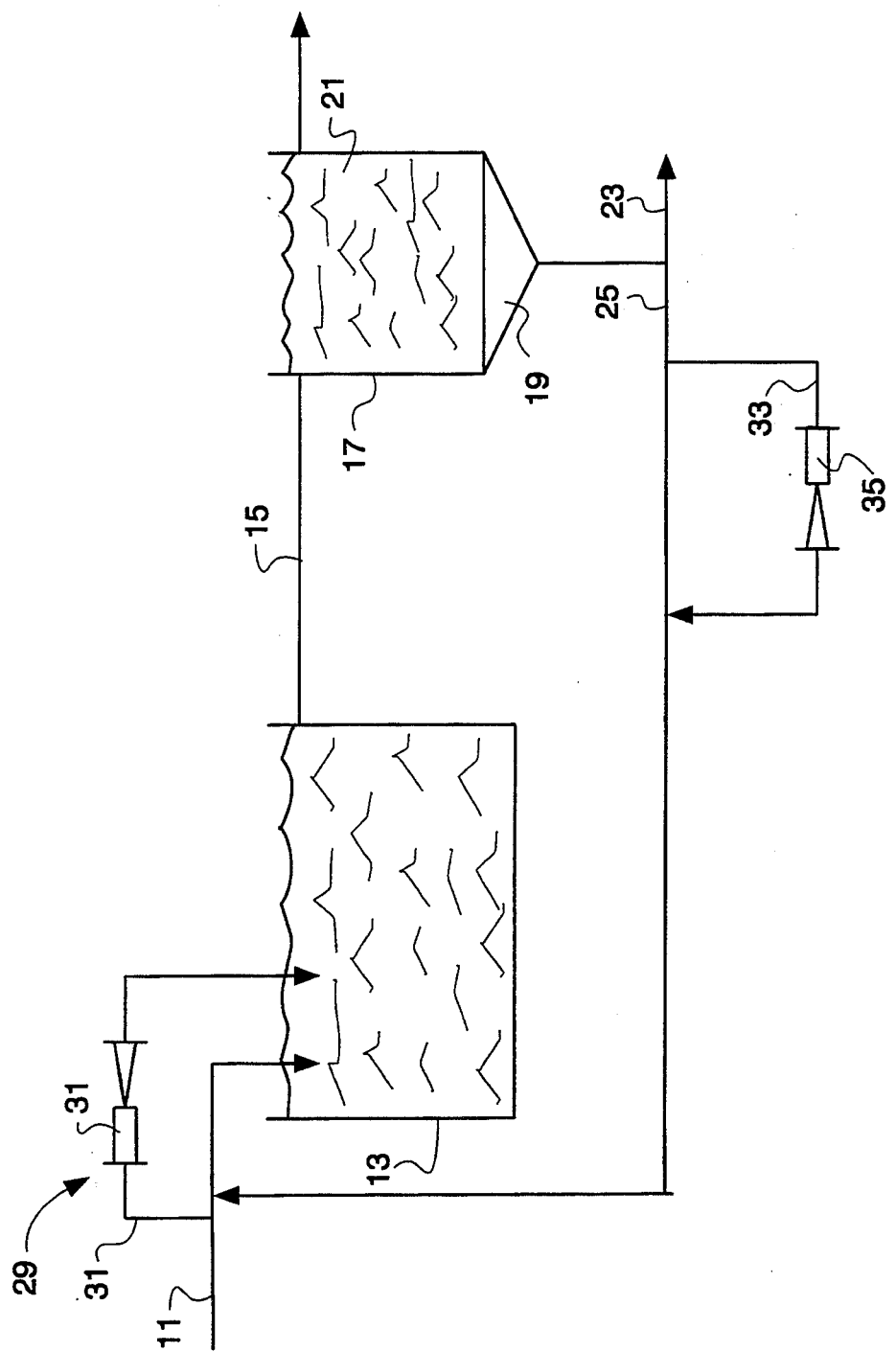
FIG. 2 is a flow diagram of another embodiment of a portion of the sewage treatment system of the invention showing indirect oxygenation of the recycle sludge stream.

Shown in FIG. 2 is another embodiment of the oxygen injection method of the present invention for injecting oxygen into the recycle sludge stream. In this embodiment a bypass line 33 is taken from the recycle sludge stream. By taking a small portion of the recycle stream a substantially higher level of oxygen can be injected into the bypass line by eductor 35 which can then be returned to the main recycle sludge stream without substantial shock to the microorganisms contained in the recycle sludge stream.

What is claimed is:

1. A method for increasing the capacity of a sewage treatment plant comprising a secondary waste water treatment tank, a settling tank downstream from the secondary waste water tank and a recycle sludge line for the transmission of a recycle sludge from the settling tank to the secondary waste water treatment tank, the method comprising injecting oxygen into the recycle sludge having an oxygen level of less than about 0.5 ppm in the recycle sludge line during transmission of the recycle sludge from the settling tank, the injection made in amounts over a period of from about three to about seven days at a rate effective for bringing the oxygen level to about 2 ppm to about 5 ppm in the recycle sludge in the recycle sludge line prior to introducing said recycle sludge into the secondary waste water treatment tank, thereby increasing the capacity of the sewage treatment plant by about 30% relative to the same plant wherein oxygen is not injected into said recycle sludge line.

2. A method in accordance with claim 1 wherein said oxygen is injected into recycle sludge in a bypass sludge line which is taken from said recycle sludge line.

* * * * *